United States Patent
Gray-Donald et al.

(10) Patent No.: US 7,032,230 B2
(45) Date of Patent: Apr. 18, 2006

(54) EFFICIENT VIRTUAL FUNCTION CALLS FOR COMPILED/INTERPRETED ENVIRONMENTS

(75) Inventors: Trent Gray-Donald, Ottawa (CA); Graeme Johnson, Ottawa (CA); Kevin A. Stoodley, Richmond Hill (CA); Julian Z. L. Wang, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 706 days.

(21) Appl. No.: 09/940,127

(22) Filed: Aug. 27, 2001

(65) Prior Publication Data

US 2003/0046449 A1 Mar. 6, 2003

(51) Int. Cl.
*G06F 9/44* (2006.01)

(52) U.S. Cl. .......................... 719/331; 718/1; 717/139

(58) Field of Classification Search ................ 719/331, 719/315, 328, 330; 717/148, 118, 139, 140, 717/166, 165, 100; 718/1
See application file for complete search history.

(56) References Cited

U.S. PATENT DOCUMENTS

| | | | | |
|---|---|---|---|---|
| 5,371,891 A | * | 12/1994 | Gray et al. ................. | 717/140 |
| 5,490,256 A | * | 2/1996 | Mooney et al. ............. | 712/227 |
| 5,768,588 A | * | 6/1998 | Endicott et al. ............ | 719/316 |
| 5,794,041 A | * | 8/1998 | Law et al. ................... | 717/104 |
| 6,151,703 A | * | 11/2000 | Crelier ........................ | 717/136 |
| 6,182,282 B1 | * | 1/2001 | Stoodley et al. ............. | 717/116 |
| 6,385,764 B1 | * | 5/2002 | Blandy et al. .............. | 717/127 |
| 6,446,259 B1 | * | 9/2002 | Brett .......................... | 717/165 |
| 6,651,248 B1 | * | 11/2003 | Alpern ........................ | 717/162 |

* cited by examiner

*Primary Examiner*—William Thomson
*Assistant Examiner*—Van Nguyen
(74) *Attorney, Agent, or Firm*—Gregory M. Doudnikoff; George Grosser

(57) ABSTRACT

Virtual function calls in hybrid compiled and interpreted computer programming environments are carried out efficiently by dual virtual function tables. Each class object generated is provided with a compiled virtual function table and an interpreted virtual function table. Each table is symmetrically structured and contiguous with the class object. Calls from an interpreted function access the interpreted virtual function table. Entries in that table point to function data structures which provide for the interpretation of the called function, or for transfer to execution of a compiled version of the called function. Calls from a compiled function access the compiled virtual function table. Entries in the compiled virtual function table point to either executable code representing the called function, or to transition code for transition to the interpreter to interpret the called function.

18 Claims, 1 Drawing Sheet

EFFICIENT VIRTUAL FUNCTION CALLS FOR COMPILED/INTERPRETED ENVIRONMENTS

BACKGROUND OF THE INVENTION

1. Field of the Invention

This invention generally relates to computing systems and in particular to systems for the implementation of efficient virtual function calls in hybrid compiled and interpreted programming language environments.

2. Description of the Related Art

Object oriented programming languages may support virtual function calls. This is the case for the object oriented language Java. Java is a trademark of Sun Microsystems, Inc. In such programming environments, functions (or methods) may be defined in a first class and then further defined in a subclass which inherits from first class. Calls to such functions or methods are referred to as virtual function calls. The extent to which functions are redefined in a piece of program code is termed the polymorphicity of the code. Programming environments which support virtual function calls include overhead to ensure that the correct function is accessed by a virtual function call.

In compiled environments, such as the typical C++ language environment, a successful approach to the implementation of virtual function calls is for the compiler to build a Virtual Function Table (VFT). The VFT includes information to permit the compiler to emit code that maps the source code virtual function call to a call to the correct function in the compiled code. VFTs provide efficient, uniform virtual call performance irrespective of the degree of polymorphicity and are reasonably compact in the memory space they occupy.

It is now common to improve the efficiency of Java language implementations by including Just In Time (JIT) compilation. In such Java JIT environments the Java virtual machine is able to call a JIT compiler to compile frequently used Java statements, typically at the function granularity. This permits increased efficiencies to be realized as the faster to execute compiled code may be used where appropriate.

In hybrid environments (such as the Java JIT interpreted and compiled environment), the use of VFTs has typically been seen as undesirable or inherently inefficient. In an interpreted-compiled environment, the prior art VFT solution does not efficiently handle the calling function due to the fact that a particular function signature may, in this hybrid environment, result in a call to a function that is either interpreted or compiled. The information required to efficiently carry out a function call is different for the two different types of functions that are being called. In addition, the calling function itself may be either interpreted or compiled in the hybrid interpreted-compiled environment. Further, called functions may be interpreted at the time that a calling function is compiled and then the called functions may later be compiled themselves.

Adaptations of VFTs to the hybrid interpreted-compiled environment have required VFTs to be uniformly accessed by and for both interpreted and compiled code with the consequential requirement that the interpreted or compiled code must include additional overhead in accessing the VFT to permit the access to be uniform. In the prior art, where VFTs are used in the hybrid environment, the interpreted environment is often modified to "look" like the compiled environment for the purposes of using the VFTs. This modification comes at the expense of reduced performance. Performing the transformation the other way also leads to performance issues as the compiled code is locked into a more restrictive calling convention.

Prior art approaches to implementing virtual function calls in interpreted-compiled environments include polymorphic inline caches at call sites, backed by global function caches fronting explicit function look ups. This approach is typically less efficient than the VFT solution, and also results in potentially non-uniform call performance.

It is therefore desirable to provide a hybrid interpreted-compiled programming language environment which provides for efficiently accessible virtual function tables.

SUMMARY OF THE INVENTION

According to an aspect of the present invention there is provided an improved hybrid compiled and interpreted computer programming environment supporting efficient virtual function calls.

According to another aspect of the present invention there is provided a computer program product for a computer programming environment supporting virtual function calls and supporting both interpretation of functions in a set of functions and execution of compiled code representing functions in the set of functions, the set of functions being referenced in one or more loaded classes in a set of computer code, the computer program product including a computer usable medium having computer readable code means embodied in the medium, including computer readable program code means for generating, for each loaded class, a first virtual function table for access by an interpreter for interpreting a call in the computer code to one of the functions in the set of functions, and a second virtual function table for access during execution of the compiled code for calling one of the functions in the set of functions.

According to another aspect of the present invention there is provided the above computer program product in which the first virtual function table includes interpretation entries, each interpretation entry being associated with a function in the set of functions and pointing to a corresponding function data structure and the second virtual function table includes compilation entries, each compilation entry being associated with a function in the set of functions and pointing to either a corresponding block of executable code or to a corresponding block of interpreter transition code.

According to another aspect of the present invention there is provided the above computer program product in which the interpreter transition code corresponding to a compilation entry for a selected associated function is executable to access the function data structure pointed to by the interpretation entry for the selected associated function.

According to another aspect of the present invention there is provided the above computer program product in which each function data structure includes a target address, the target address pointing to either a send target or a compiled transition target, the send target being the address loaded by the interpreter for interpretation of a function in the set of functions, and the compiled transition target being the address for a code block to permit transition to executable code corresponding to a function in the set of functions.

According to another aspect of the present invention there is provided the above computer program product further including, for each loaded class, a class object including a first end and a second end, in which the first virtual function table for the loaded class is contiguous with the first end of the class object, and the second virtual function table for the loaded class is contiguous with the second end of the class object and in which the first virtual function table and the second virtual function table are structured symmetrically about the class object.

According to another aspect of the present invention there is provided the above computer program product in which the interpreter transition code is defined to access a selected function data structure by calculating an interpretation entry location in the first virtual function table using the symmetrical structure of the first and the second virtual function tables.

According to another aspect of the present invention there is provided the above computer program product in which each function data structure includes a counter for determining the timing of compilation of the function associated with the interpretation entry for the function data structure.

According to another aspect of the present invention there is provided the above computer program product in which the counter is initialized to a predetermined odd value and is decremented by two on each access of the function data structure until the counter reaches a negative value, the counter being replaced with an even-value address on compilation of the function associated with the interpretation entry for the function data structure.

According to another aspect of the present invention there is provided the above computer program product further including, for each loaded class, a class object and in which the first virtual function table for the loaded class and the second virtual function table for the loaded class are interleaved with each other and are contiguous with the class object.

According to another aspect of the present invention there is provided a Java virtual machine including an interpreter, supporting virtual method calls and supporting both interpretation of methods in a set of methods and execution of compiled code representing methods in the set of methods, the set of methods being referenced in one or more loaded Java classes, the Java virtual machine including a computer usable medium having computer readable code means embodied in the medium, including computer readable program code means for generating, for each loaded Java class, a first virtual function table for access by the interpreter for interpreting a call to one of the methods and including interpretation entries, each interpretation entry being associated with a method and pointing to a corresponding function data structure and a second virtual function table for access in the execution of the compiled code to execute a call to one of the methods and including compilation entries, each compilation entry being associated with a function in the set of functions and pointing to either a corresponding block of executable code or to a corresponding block of interpreter transition code, the interpreter transition code corresponding to a compilation entry for a selected associated function being executable to access the function data structure pointed to by the interpretation entry for the selected associated function.

According to another aspect of the present invention there is provided the above Java virtual machine further including, for each loaded Java class, a class object including a first end and a second end, in which the first virtual function table for the loaded Java class is contiguous with the first end of the class object, and the second virtual function table for the loaded class is contiguous with the second end of the class object and in which the first virtual function table and the second virtual function table are structured symmetrically about the class object.

According to another aspect of the present invention there is provided the above Java virtual machine in which the interpreter transition code corresponding to a compilation entry for a selected associated function is executable to access the function data structure pointed to by the interpretation entry for the selected associated function by calculating an interpretation entry location in the first virtual function table using the symmetrical structure of the first and the second virtual function tables.

According to another aspect of the present invention there is provided the above Java virtual machine in which each function data structure includes a target address, the target address pointing to either a send target or a compiled transition target, the send target being the address loaded by the interpreter for interpretation of a function in the set of functions, and the compiled transition target being the address for a code block to permit transition to executable code corresponding to a function in the set of functions.

According to another aspect of the present invention there is provided a Java language programming environment, supporting virtual method calls and supporting both interpretation of methods in a set of methods and execution of compiled code representing methods in the set of methods, the set of methods being referenced in one or more loaded Java classes, the Java language programming environment including, for each loaded Java class, a first virtual function table for access by the interpreter for interpreting a call to one of the methods and including interpretation entries, each interpretation entry being associated with a method and pointing to a corresponding function data structure and a second virtual function table for access in the execution of the compiled code to execute a call to one of the methods and including compilation entries, each compilation entry being associated with a function in the set of functions and pointing to either a corresponding block of executable code or to a corresponding block of interpreter transition code, the interpreter transition code corresponding to a compilation entry for a selected associated function being executable to access the function data structure pointed to by the interpretation entry for the selected associated function.

According to another aspect of the present invention, there is provided a method for creating a hybrid application for execution by a computer, said hybrid application comprising interpreted code and compiled code, said hybrid application comprising a function, said method comprising: creating a first function table for access by an interpreter for interpreting a call in said interpreted code to said function; and creating a second function table for access during execution of said compiled code, said access for a call in said compiled code to said function.

Advantages of the invention include the provision of efficient calls to functions in a hybrid programming environment supporting both interpreted and compiled functions.

BRIEF DESCRIPTION OF THE DRAWINGS

In the accompanying drawing which illustrates the invention by way of example only.

Figure 1:
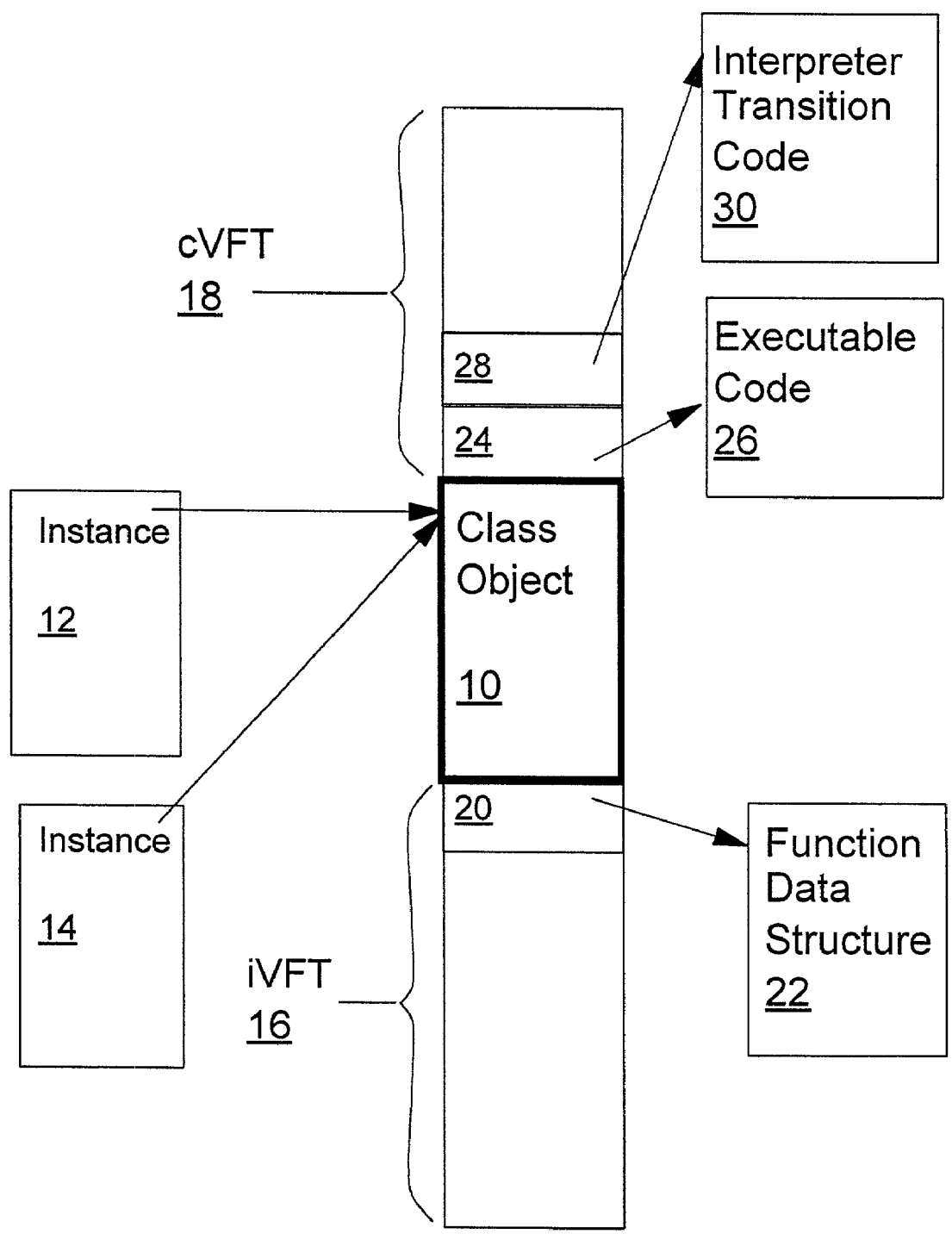
FIG. 1 is a block diagram illustrating an example virtual function table application in accordance with the preferred embodiment of the invention.

In the drawing, the preferred embodiment of the invention is illustrated by way of example. It is to be expressly understood that the description and drawings are only for the purpose of illustration and as an aid to understanding, and are not intended as a definition of the limits of the invention.

DESCRIPTION OF THE PREFERRED EMBODIMENT

FIG. 1 shows, in a block diagram view, an example of the virtual function table (VFT) implementation of the preferred embodiment. In the preferred embodiment, the environment described is the Java virtual machine environment supporting both interpretation and just in time compilation. It will be understood by those skilled in the art that the preferred embodiment may also be implemented with reference to other hybrid compiled/interpreted environments that support virtual function calls. The preferred embodiment describes a Java virtual machine that includes both an interpreter and a compiler. Those skilled in the art will appreciate that the preferred embodiment is applicable to environments which support interpretation of code and the execution of compiled code. This code may be pre-compiled and made available to the environment or may be compiled by a compiler included in the programming environment.

In FIG. 1, a class object 10 is shown. Class object 10 is an object in memory that is generated by the programming language environment when a class is loaded. Environments other than that of the preferred embodiment may provide for objects analogous to class object 10 (type metadata is an analogous construct in C++, for example). In the preferred embodiment, class object 10 has defined characteristics and a defined size. The natural application of the preferred embodiment is an object oriented programming environment such as that described. However, the preferred embodiment may also be implemented for other programming environments supporting virtual function calls. The preferred embodiment is described using the terminology of object oriented environments but will be understood by those skilled in the art to be applicable to non-object oriented environments, also.

In the example of FIG. 1, class object 10 is shown as being referenced by instance 12 and instance 14. These represent different instances of the class represented by class object 10. Class object 10 in the example of FIG. 1 represents a class that includes functions (the term function is used as a general descriptor, it is understood by those skilled in the art that in the Java environment of the preferred embodiment the term method is used). The functions of the class may either be defined in the class or may be inherited by the class from a superclass. In either case, the functions associated with class object 10 must be identifiable to permit both the interpreter and compiled code to correctly set up calls to functions available in class object 10. As is shown in FIG. 1, the preferred embodiment meets this requirement by providing that class object 10 has two virtual function tables associated with it. One of these is iVFT 16 which represents the virtual function table for calls from interpreted methods or functions. The other is cVFT 18 which is the virtual function table for calls from compiled methods or functions. Each of the VFTs 16,18 include entries that are used to permit appropriate called functions to be executed. In the example of FIG. 1, iVFT 16 includes entry 20 which points to function data structure 22. For cVFT 18, entry 24 refers to executable code 26 and entry 28 points to interpreter transition code 30. As may be seen from the arrangement of entries in iVFT 16 and cVFT 18, function data structure 22 and executable code 26 represent the same function, accessible in objects instantiating the class represented by class object 10.

By defining two VFTs, the preferred embodiment provides that the information required for either a call from an interpreted function or a call from a compiled function will be directly available. The preferred embodiment describes the two VFTs as being separate tables with positive (for iVFT 16) and negative (for cVFT 18) offsets from class object 10. Alternatives to this embodiment (not shown) include arranging the two VFTs to be interleaved or to having the two VFTs in different memory spaces separate from class object 10, but pointed to by class object 10.

In the preferred embodiment, iVFT 16 and cVFT 18 are built symmetrically in opposite directions around class object 10. Each function that requires an entry in the virtual function tables (in the preferred embodiment, all Java non-static methods that are not constructors) will have an entry available in both iVFT 16 and cVFT 18. The structure of the VFTs in the preferred embodiment ensures that corresponding entries in the two tables have identical positive and negative offsets from the two ends of class object 10, respectively.

In hybrid interpreted-compiled environments there are four potential combinations of function calls:

| Calling Function | Called Function |
| --- | --- |
| Compiled | Compiled |
| Compiled | Interpreted |
| Interpreted | Compiled |
| Interpreted | Interpreted |

The environment of the preferred embodiment handles both compiled to compiled function calls and interpreted to interpreted function calls in a straightforward manner. When compiled code is emitted by the JIT compiler, virtual function calls in that code are defined to access the appropriate entries in cVFT 18. When the compiled code calls a compiled function, the appropriate entry in cVFT 18 will directly reference executable code for the called function. This is shown in the example of FIG. 1 by entry 24 in cVFT 18 referencing executable code 26. In the preferred embodiment, executable code for a function may have more than one entry point. The entry in cVFT which references a compiled function (entry 24 in cVFT 18 in the example of FIG. 1) points to the compiled to compiled entry point in the executable code (executable code 26 in FIG. 1).

Where a function call is from an interpreted function to an interpreted function, the environment of the preferred embodiment supports a call sequence in which the interpreter fetches the function data structure by the interpreter accessing entries in iVFT 16. In the preferred embodiment the entries in iVFT 16 are an array of pointers to the function data structures. The function data structures are defined to permit the interpreter to call the associated functions. Function data structures include the address to jump to to run the called method. In the preferred embodiment, this address is referred to as the "send target". In the preferred embodiment, the interpreter uses send targets to model method dispatch. The interpreter is a continuation style interpreter. To carry out a call, the function data structure is fetched by the interpreter and the send target is accessed. The send target includes code to carry out the steps required to permit the function to be called. The send target is jumped to and all necessary prologue work is done. For example, the appropriate registers are loaded and a stack frame may be built. The work is customized for specific method types so that execution of the target method proceeds in the most optimal manner possible. In the preferred embodiment, the function data structure also includes a counter that is described in more detail below.

By accessing the appropriate entry in iVFT 16, the interpreter is able to obtain the send target to permit the called interpreted function to be run. This is shown in the example of FIG. 1 by entry 20 pointing to function data structure 22.

When a compiled function calls an interpreted function, the entry in cVFT 18 does not point to executable code for that function. Rather, the cVFT entry references a function that permits the execution to transition to the interpreter to interpret the interpreted function. In FIG. 1 this is shown by entry 28 and interpreter transition code 30. Interpreter transition code 30 (also referred to in the preferred embodiment as a "glue" method) is defined to access the appropriate function data structure.

Interpreter transition code 30 accesses the function data structure for the function. This is carried out (as is described in more detail below) by accessing the corresponding iVFT entry. Where the function data structure for the function indicates that the function to be called is, in fact, a function that has not yet been compiled, interpreter transition code 30 makes the appropriate environment adjustments to permit control to pass to the interpreter from the compiled function being executed. Interpreter transition code also ensures that values returned from the interpreted function to the calling (compiled function) will be correctly available to the calling function. Once these steps are carried out, control is usually passed to the interpreter send target (as described above) which interprets the interpreted function defined by the function data structure. However, for some of the more popular transition types, special sequences of glue code in, or accessed by, transition code 30 are used that perform the work of the send target, avoiding an extra indirect jump, thus improving performance.

In the preferred embodiment, interpreter transition code 30 determines the appropriate function data structure by making use of the symmetrical structures of the two VFTs. Because the absolute values of the offsets for the iVFT and the cVFT are the same for the same function, the offset into iVFT can be determined by reference to the offset into cVFT 18. In the preferred embodiment the interpreter transition code is able to determine the cVFT offset and this is then used to determine the entry in iVFT 16 for the function being called.

In the preferred embodiment, the offset is determined by relying on the return address for the call to the interpreter transition code being in a defined location. This permits the call instruction to the interpreter transition code to be located. The call instruction is defined in reference to an offset from class object 10 and this offset can therefore be determined from looking at an operand or operands from the instruction or instructions used to implement the virtual call. In the IA32 architecture, for example, the offset is found in a memory location immediately preceding the indirected return address from the Java stack. In alternative architectures such as the Power PC architecture the return address will be located in a special register. The offset is determined in both cases by inspecting the instruction or instructions preceeding the return address. The correct instruction or instructions may be determined by relying on the known convention defined for the particular JIT compiler and runtime in question.

Interpreter transition code 30 also is defined in the preferred embodiment to ensure that the return values from the called function are properly available to the calling compiled function. To handle different return types there are different defined variations of interpreter transition code 30. The variation of interpreter transition code 30 that is executed to carry out the call to an interpreted function will correspond to the type of returned values defined for the interpreted function. In the preferred embodiment there are different interpreter transition code variants defined for void, int, double, long and float types, as well as variations for synchronized functions.

In addition, on some architectures, the mechanism for passing parameters to compiled functions is different than when passing parameters to interpreted functions. Thus some extra glue code that is specific to each function signature is required on transition. For example, a method with signature (int, int) may, depending on the calling convention used, require different transition glue code (callable from interpreter transition code 30) than one that is (float, int). Typically, the difference in calling conventions will exist for only a certain number of parameters in a given function call, after which the parameters will be handled in the same way. In the preferred embodiment, to make the requirement of different versions of interpreter transition code 30 less expensive in space, these transitions are shared on a per signature basis up to the end of the difference between the calling conventions (for example, if in a given architecture, only the first 3 parameters are passed differently when calling a compiled function in comparison with an interpreted function, different transition glue code will only be required for the first 3 parameters). This approach generates significant space savings.

In the preferred embodiment, the signature specific glue code is placed as the first part of interpreter transition code 30, followed by a branch to the return type specific transition glue code, that may be used by other signature specific glue code variants having the same return type.

Function data structures also include data which define whether the function associated with a given function data structure has been compiled or not. This information is used in the preferred embodiment because functions may become compiled by the just in time compiler during program execution. When this occurs, the cVFT table will be updated to refer to the (compiled) executable code for the function rather than to the interpreter transition code. In the preferred embodiment, interpreter transition code 30 carries out the updating of the cVFT entry, when necessary. This is achieved by interpreter transition code 30 accessing function data structure 22. Where function data structure 22 indicates that the function has been compiled, interpreter transition code 30 replaces the value in the appropriate entry (in cVFT 18 the entry for interpreter transition code 30 is entry 28) with a reference to the appropriate compiled code for the function (which reference is available in function data structure 22) and then transfers control directly to the compiled code as is done in a compiled function to compiled function call.

The final possible call sequence is when an interpreted function calls a compiled function. In this case, the preferred embodiment provides for a similar sequence of steps as is carried out for an interpreted to interpreted function call. In the call to a compiled function, however, the function data structure that is specified by the appropriate entry in iVFT 16 has the send target replaced with a compiled transition target. The interpreter will jump to the instructions specified by the compiled transition target, just as for an interpreted to interpreted function call the interpreter will jump to the send target instructions. The result of jumping to the compiled transition target, however, is that the compiled function will be invoked.

In the preferred embodiment, there are different compiled transition targets defined corresponding to unique return value signatures in the programming language environment. Specifically, for the Java environment of the preferred embodiment, there are five such return signatures (void, int, long, float, double). Each of these return signatures has a compiled transition target associated with it. The compiled transition target carries out the steps prior to a jump to the executable code corresponding to the called compiled function. These prior steps will depend on the interpreter and compiler design selected in the programming environment. For example, in the preferred embodiment, a special transition stack frame is pushed onto the Java stack, followed by a re-push of the arguments for the called function. Once the arguments are pushed, a call instruction is emitted, which jumps to the entry point in the executable code for the called function (interpreted). The return value from the executable for the called function will be pushed onto the Java stack from the correct registers as a result of the code in the compiled transition target which is specific to the return signature associated with the called function.

In certain architectures and implementations there are different entry points in executable code for functions, depending on whether the code is called from a compiled function or an interpreted function. In the preferred embodiment, the use of a dual VFT permits the correct entry point to be defined for the two different access paths in a straightforward way. The compiled transition target will refer to the interpreted function call entry point whereas the cVFT entry point will refer to the compiled function call entry point.

An example of an architecture where different entry points are defined is an architecture where parameters for a compiled function are passed in registers but where parameters for an interpreted function are passed on the stack. In such a case, the interpreted call entry point will be at a location in the executable code which will carry out the loading of the registers. For a call to the compiled function which comes from the interpreted function side of the system, the interpreted call entry point will be used to ensure that the parameters are loaded into the appropriate registers before the compiled function code is executed. Similarly, when the compiled function executable code is called from a compiled function, the entry point will be different because the appropriate registers will not need to be loaded.

The order of table entries for iVFT 16 and cVFT 18 is defined in the manner known in the art for generating VFTs for programming environments and is dependent on the language rules defined by the specification of a particular programming language. The definition of iVFT 16 will precede that for cVFT 18. The cVFT is built by scanning the iVFT and defining the correct interpreter transition code segments for each entry in the cVFT and by building pointers to those code fragments (for example entry 28 pointing to code 30). This initializes the cVFT such that for any compiled function calling an interpreted function the correct iVFT entry will be located and the interpreted function will be executed by the interpreter.

Where a function becomes compiled, the appropriate entry in cVFT 18 is revised to point to the executable code (for example, executable code 26 pointed to by entry 24 in FIG. 1), similarly, the send target in the appropriate function data structure is modified to a compiled transition target referencing the executable code for the now compiled function.

In the preferred embodiment the counter in the function data structure is used to determine when a function should be sent to the JIT for compilation. In the implementation of the preferred embodiment, executable code is defined to be aligned such that the entry point for the code has an address with a "0" low bit. The counter in the function data structure is defined such that if the low bit is "1" then the counter is decremented by two (thus keeping it odd) on each pass through the function data structure. When the counter goes negative, the function is flagged for compilation. Once the function is compiled, the address for the compiled function executable code is stored in the counter. Therefore, if the low bit for the counter is "0" the function has already been compiled and the function should be run in its compiled form. This flag is used, as described above, to permit interpreter transition code to replace the appropriate entry in the cVFT where necessary. As described above, when execution of interpreter transition code results in access to a function data structure that indicates that the called function is compiled, then the cVFT entry is overwritten with the compiled function executable code entry point.

Although a preferred embodiment of the invention has been described above, it will be appreciated by those skilled in the art that variations may be made, without departing from the spirit of the invention or the scope of the appended claims.

The invention claimed is:

1. A computer program product comprising a computer usable medium bearing computer code for use by a computer environment supporting virtual function calls and supporting both interpretation of functions in a set of functions and execution of compiled code representing functions in the set of functions, the set of functions being referenced in one or more loaded classes in a set of computer code, the computer program product, comprising:

a computer program code representation executable by a computer for generating, for each loaded class:

a first virtual function table for access by an interpreter for interpreting a call in the computer code to one of the functions in the set of functions, and a second virtual function table for access during execution of the compiled code for calling one of the functions in the set of functions wherein the first virtual function table comprises interpretation entries, each interpretation entry being associated with a function in the set of functions and pointing to a corresponding function data structure, and the second virtual function table comprises compilation entries, each compilation entry being associated with a function in the set of functions and pointing to either a corresponding block of executable code or to a corresponding block of interpreter transition code, and in which the interpreter transition code corresponding to a compilation entry for a selected associated function is executable to access the function data structure pointed to by the interpretation entry for the said selected associated function.

2. The computer program product of claim 1 in which each function data structure comprises a target address, the target address pointing to either a send target or a compiled transition target, the send target being the address loaded by the interpreter for interpretation of a function in the set of functions, and the compiled transition target being the address for a code block to permit transition to executable code corresponding to a function in the set of functions.

3. The computer program product of claim 1 in which each function data structure comprises a counter for determining the timing of compilation of the function associated with the interpretation entry for the function data structure.

4. The computer program product of claim 3 in which the counter is initialized to a predetermined odd value and is decremented by two on each access of the function data structure until the counter reaches a negative value, the counter being replaced with an ever-value address on compilation of the function associated with the interpretation entry for the function data structure.

5. The computer program product of claim 1 further comprising, for each loaded class, a class object and in which the first virtual function table for the loaded class and the second virtual function table for the loaded class are interleaved with each other and are contiguous with the class object.

6. A computer program product comprising a computer usable medium bearing computer readable code for a computer programming environment supporting virtual function calls and supporting both interpretation of functions in a set of functions and execution of compiled code representing functions in the set of functions, the set of functions being referenced in one or more loaded classes in, a set of computer code, the computer program product comprising computer readable code for generating, for each loaded class:
a first virtual function table for access by an interpreter for interpreting a call in the computer code to one of the functions in the set of functions, and
a second virtual function table for access during execution of the compiled code for calling one of the functions in the set of functions; and, wherein
for each loaded class, a class object comprising a first end and a second end, in which the first virtual function table for the loaded class is contiguous with the first end of the class object, and the second virtual function table for the loaded class is contiguous with the second end of the class object and in which the first virtual function table and the second virtual function table are structured symmetrically about the class object.

7. The computer program product of claim 6, wherein the first virtual function table comprises interpretation entries, each interpretation entry being associated with a function in the set of functions and pointing to a corresponding function data structure and
the second virtual function table comprises compilation entries, each compilation entry being associated with a function in the set of functions and pointing to either a corresponding block of executable code or to a corresponding block of interpreter transition code.

8. The computer program product of claim 7 in which the interpreter transition code corresponding to a compilation entry for a selected associated function is executable to access the function data structure pointed to by the interpretation entry for the said selected associated function.

9. The computer program product of claim 8 in which the interpreter transition code is defined to access a selected function data structure by calculating an interpretation entry location in the first virtual function table using the symmetrical structure of the first and the second virtual function tables.

10. The computer program product of claim 9, wherein each function data structure comprises a target address, the target address pointing to either a send target or a compiled transition target, the send target being the address loaded by the interpreter for interpretation of a function in the set of functions, and the compiled transition target being the address for a code block to permit transition to executable code corresponding to a function in the set of functions.

11. The computer program product of claim 8, wherein each function data structure comprises a target address, the target address pointing to either a send target or a compiled transition target, the send target being the address loaded by the interpreter for interpretation of a function in the set of functions, and the compiled transition target being the address for a code block to permit transition to executable code corresponding to a function in the set of functions.

12. The computer program product of claim 7 in which each function data structure comprises a counter for determining the timing of compilation of the function associated with the interpretation entry for the function data structure.

13. The computer program product of claim 12 in which the counter is initialized to a predetermined odd value and is decremented by two on each access of the function data structure until the counter reaches a negative value, the counter being replaced with an even-value address on compilation of the function associated with the interpretation entry for the function data structure.

14. A Java virtual machine, which operates on a computer system, comprising an interpreter, supporting virtual method calls and supporting both interpretation of methods in a set of methods and execution of compiled code representing methods in the set of methods, the set of methods being referenced in one or more loaded Java classes, the Java virtual machine comprising a computer usable medium having computer readable code recorded therein, comprising computer readable program code for generating, for each loaded Java class;
a first virtual function table for access by the interpreter for interpreting a call to one of the methods and comprising interpretation entries, each interpretation entry being associated with a method and pointing to a corresponding function data structure; and
a second virtual function table for access in the execution of the compiled code to execute a call to one of the methods and comprising compilation entries, each compilation entry being associated with a function in the set of functions and pointing to either a corresponding block of executable code or to a corresponding block of interpreter transition code,
the interpreter transition code corresponding to a compilation entry for a selected associated function being executable to access the function data structure pointed to by the interpretation entry for the said selected associated function.

15. The Java virtual machine of claim 14 further comprising, for each loaded Java class, a class object comprising a first end and a second end, in which the first virtual function table far the loaded Java class is contiguous with the first end of the class object, and the second virtual function table for the loaded class is contiguous with the second end of the class object and in which the first virtual function table and the second virtual function table are structured symmetrically about the class object.

16. The Java virtual machine of claim 15 in which the interpreter transition code corresponding to a compilation entry for a selected associated function is executable to access the function data structure pointed to by the interpretation entry for the said selected associated function by calculating an interpretation entry location in the first virtual function table using the symmetrical structure of the first and the second virtual function tables.

17. The Java virtual machine of claim 16 in which each function data structure comprises a target address, the target address pointing to either a send target or a compiled transition target, the send target being the address loaded by the interpreter for interpretation of a function in the set of functions, and the compiled transition target being the address for a code block to permit transition to executable code corresponding to a function in the set of functions.

18. A Java language programming environment running on a computer system, supporting virtual method calls and supporting both interpretation of methods in a set of methods and execution of compiled code representing methods in the set of methods, the set of methods being referenced in one or more loaded Java classes, the Java language programming environment comprising, for each loaded Java class:

a first virtual function table for access by the interpreter for interpreting a call to one of the methods and comprising interpretation entries, each interpretation entry being associated with a method and pointing to a corresponding function data structure; and a second virtual function table for access in the execution of the compiled code to execute a call to one of the methods and comprising compilation entries, each compilation entry being associated wit a function in the set of functions and pointing to either a corresponding block of executable code or to a corresponding block of interpreter transition code, the interpreter transition code corresponding to a compilation entry for a selected associated function being executable to access the function data structure pointed to by the interpretation entry for the said selected associated function.

* * * * *